Patented June 24, 1930

1,767,185

UNITED STATES PATENT OFFICE

CARL NIELSEN, OF LAKE BLUFF, ILLINOIS, ASSIGNOR TO ABBOTT LABORATORIES, OF NORTH CHICAGO, ILLINOIS, A CORPORATION OF ILLINOIS

FOOD FOR INVALIDS OR INFANTS

No Drawing. Application filed September 11, 1926. Serial No. 134,942.

My invention relates to the production of a food for invalids or infants, and its principal object is to produce a food which is high in nutritive value while at the same time it shall be relatively easy to digest.

Further objects of the invention are to provide a food high in vitamine content; to provide a process for manufacturing or producing said food economically and conveniently; to provide a food of the character specified which comes to the consumer in convenient form for utilization or preparation in the form of a liquid without the necessity of troublesome manipulation before being ready for consumption; and in general to provide an improved food and method of producing the same of the character referred to.

This application is a continuation in part of my co-pending application, Serial No. 546,271, filed March 24, 1922.

Prior to the date of my invention, so far as I am aware, it was the general impression among dieticians and physicians having to do with the care of infants or children, that the juices of fruits such as oranges or lemons, were of considerable value as an adjunct to the regular diet. However, in the case of milk or liquid foods administered to infants and others, it was thought essential to give such juices in between feedings and not with the actual milk or liquid food itself. It was believed that the addition of an acid such as orange juice to milk, would be undesirable because of its curdling or other effect in the stomach.

I have discovered that contrary to the prior belief, the addition of a suitable acid to a milk or milk food prior to its administration to the subject is not only innocuous but is also of extreme benefit especially where the digestion of the subject is weak or otherwise faulty. It is of course understood that such acid should be used with discretion in the proper proportions.

In the case of a fruit juice, aside from its function in furnishing desirable mineral salts and the anti-scorbutic vitamines, I have observed another very important benefit. It is well known that when ordinary cow's milk or a modified cow's milk is fed or taken, the digestive process is slow in commencing and is unduly prolonged; much more so than in the case of normal human milk when fed to the same subject.

This is apparently due to two things. In the first place cow's milk when subjected to the action of the acids in the stomach is converted into relatively large lumps of curd which owing to their large size and general character, are not readily attacked or broken up in the digestive process. Secondly, cow's milk has a very strong buffer action. (A buffer is a compound which absorbs an acid or an alkali in substantial amounts before the true reaction begins to take place or the hydrogen ion concentration or pH varies in any appreciable amount.) The effect of this is that large amounts of the stomach acids are apparently expended uselessly before the desired reaction takes place and before the true digestive process can commence. Hence in the case of normal persons and particularly persons with a very weak digestive system whose stomach acids are relatively weak or small in amount, the digestive process is seriously retarded.

In practicing my invention many non-poisonous acids, for example, hydrochloric acid, vinegar, acetic acid, lactic acid, citric acid as well as the juices of natural fruits, for instance, tomatoes, oranges, etc., may be employed; but in order to secure the additional benefit of an anti-scorbutic food I prefer to use the juice of a fruit. I have used orange juice to great advantage in this connection.

In employing such acids as an ingredient to be mixed with the milk or liquid food a sufficient quantity of acid should be used to secure the desired improvement in the digestion of subjects or patients requiring such acid. However, in the case of normal persons with a lusty digestion, excessive amounts of acid in the milk are apparently not always so desirable. Therefore, in order to supply a standardized food suitable for the average run of subjects including persons with relatively weak or relatively strong digestions, I find it desirable to compromise by supplying a sufficient amount of acid so as to greatly improve the digestion of the weaker, while not materially disturbing the natural digestive function of the stronger subject.

Ordinarily I find it desirable to add, in the case of orange juice, one teaspoonful of the juice of an ordinary orange to eight ounces of milk or liquid food in concentration suitable for feeding infants.

This works out to about two and a half fluid ounces of orange juice for each one pound of prepared milk in the dry form.

The addition of the above amount of orange juice or an equivalent amount of other acid decreases or lowers the pH concentration of the food to a material extent and so in a measure overcomes the strong buffer action which is present in cow's milk or dilutions thereof. Thus the digestibility is improved.

In order to obtain the maximum benefit from the invention in practice without undesirable effects, the addition of the proper quantity of acid should not be left to the judgment or discretion of the person having charge of the direct feeding of the patient. I have previously said that the acid should be added in the proper proportion and not in any haphazard manner. Therefore, the advantage of supplying the milk or food in a prepared or ready mixed condition will be readily apparent. To attain this result in the case of a reconstructed or prepared milk suitable for infant feeding, I employ the method and procedure set forth in my co-pending application above referred to, as follows:—

*Process*

The cream is skimmed or separated from a supply of fresh milk, pasteurized or not pasteurized, containing 3½% to 4% of butter fat. Said cream will ordinarily contain 18% of butter fat and is homogenized by any suitable process.

In the homogenized cream, I dissolve the maltose and dextrines formed by treating cereals in the usual way with barley malt. Said maltose-dextrine mixtures ordinarily contain about 50% maltose and 50% dextrines, and sufficient of same is dissolved in the cream so that, according to past experience in practicing the process, the ultimate product will contain 59% total carbo-hydrates.

To the liquid there is then added a quantity of soluble lactalbumen. The amount added together with that already present in the average cream is sufficient to make 6.4% lactalbumen content in the ultimate product. Said soluble lactalbumen may be prepared or isolated from sweet whey by the process described by Professor Weimar of the United States Agriculture Bureau in U. S. Patent No. 1,381,605, issued June 14, 1921.

Sufficient orange juice is then added to the mixture to represent with the mineral salts 5.45% (solid equivalent) of the final product.

The liquid mixture then contains about 60% of solids and is desiccated by any suitable process such as is used for the desiccation of milk. However, care should be taken that the material is not subjected to high temperatures for extended periods or to highly oxidizing agencies, otherwise the vitamine content may be impaired.

The atomizing or spraying method of desiccation has been found to give excellent results in connection with my product.

As quickly as possible after the powder has been drawn from the evaporating chamber, it is cooled to room temperature, or desirably somewhat lower, and is then packaged in cans or other receptacles, preferably by a forced filling process in order to make the powder as small in bulk as possible, and thereby to reduce the quantity of air present in the completed package.

An analysis of the milk powder prepared as above will give approximately the following percentages:—

| | Per cent |
|---|---|
| Butter fat | 24 |
| Carbo-hydrates | 59 |
| Proteins: | |
|   Casein | 3.2 |
|   Lactalbumen | 6.4 |
| | 9.6 |
| Mineral salts | 3.5 |
| Orange juice (solid equivalent) | 2.0 |
| Moisture | 1.9 |
| Total | 100.0 |

My improved food will keep and is stable for a long time at ordinary temperature and will withstand even tropical temperatures for extended periods. Its keeping qualities are partly due to the fact that the fat globules of the original fresh cream have been materially decreased in size by the homogenizing process and not only have been ruptured by the desiccating process, but in addition have been enveloped by the lactalbumen and sugars added to the fresh cream. Thus the globules of fat being protected from the action of the atmosphere by their insulating coating of these materials do not become rancid.

My improved food is usually used in a one-eighth strength, i. e., one ounce by weight of the dried powder is mixed or dissolved to form an emulsion or solution in seven parts by weight of water. It is very palatable, in fact very much more so than the ordinary artifically prepared baby food. Its physiological effect in passing through the digestive tract is practically identical with that of human milk, and nutritively it is about equal to human milk, for the reason that its principal nutritive ingredients are in about the same relative proportions and are chemically and nutritively substantially equivalent to such constituents present in human milk.

The growth of the bony and other tissues of the infant is very well taken care of for the reason that not only does the food contain the same minerals as normal human milk, but essential minerals are present in even greater proportions than in the human article.

A very important feature in connection with this improved product is the maintenance of the vitamines present in human milk, namely, vitamines "A," "B" and "C," which also occur in necessary proportions in my improved food. Furthermore, owing to the fact that the food itself contains a considerable percentage of orange juice, it is rarely necessary to feed the baby with additional orange juice as is very often the practice after the infant reaches the age of a few months.

It will be understood that orange juice is of particular value in furnishing the antiscorbutic vitamine element C. Owing to the brief heating, practically instantaneous vaporization and the subsequent rapid cooling of the solid product, the vitamine content is substantially unaffected by the drying process.

When my improved food is introduced into the stomach of the patient there is formed a finely divided precipitate which is readily digested, as distinguished from the lumpy curds formed in the stomach when ordinary cow's milk is taken. I believe this is partly due to the fact that the evaporation by the spray method assures a very fine separation of the food particles. I believe, however, that this beneficial effect is also attributable to the fact that the orange juice is added to the mixture before desiccation takes place, as in my opinion the orange juice at the temperature of evaporation has a chemical action on the calcium caseinate of the milk which curbs its curd-forming tendency.

Also my method of adding the orange juice to the mixture prior to the evaporation thereof makes it possible to produce a prepared food which will keep a long time although it contains orange juice. It is well known that although orange juice has been evaporated and converted to powder, orange juice powder is quite hygroscopic and otherwise unstable. The pectine contents in orange juice not only make it difficult to desiccate but even after desiccation, on account of the pectines themselves and other constituents the solidified juice is not at all stable. The result is that orange juice powder even though sealed hermetically will revert to a hard solid mass within a comparatively short period.

I attribute the keeping qualities of my improved fruit compound, although the same contains orange juice, to the fact that the particles of orange juice are enveloped in the main body material which contains albumen, sugar and fat and are, therefore, separated from each other and protected against hygroscopic or other action.

The described details of composition and process employed being merely illustrative of a single phase of my invention, the scope of same should be determined by the appended claims, said claims being construed as broadly as possible consistent with the state of the art.

I claim:—

1. As a new article of diet, substantially unfermented milk containing as a minor added ingredient an innocuous acid in sufficient amount to substantially reduce the buffer action normally present in said milk without said acid.

2. As a new article of diet, substantially unfermented milk containing as a minor added ingredient a fruit juice in sufficient amount to substantially reduce the buffer action normally present in said milk without said acid, while not materially changing other normal characteristics of said milk.

3. The improvement in the art of manufacturing a readily digestible milk powder which consists in adding to substantially unfermented milk a small percentage of an innocuous acid in sufficient amount to substantially reduce the buffer action normally present in said milk without said acid, and subsequently vaporizing the liquid.

4. The improvement in the art of manufacturing a readily digestible milk powder which consists in adding to substantially unfermented milk a small percentage of a fruit juice in sufficient amount to substantially reduce the buffer action normally present in said milk without said juice, and subsequently vaporizing the liquid.

5. As a new article of diet, a concentrated milk food containing as a minor added ingredient, an innocuous acid in sufficient amount to substantially reduce the buffer action normally present in said milk without said acid, and containing a relatively large amount of butter fat subdivided in relatively small particles and enveloped in self-preserving food material.

6. As a new article of diet, a dried milk product containing substantially unfermented milk and having as a minor ingredient, an innocuous acid which has been added before desiccation thereof, said acid being in sufficient quantity to substantially reduce the buffer action normally present in said milk without said acid.

7. As a new article of diet, a concentrated unfermented milk product which is nutritively substantially equivalent to human milk and containing as a minor ingredient an innocuous acid which has been added before desiccation thereof, said acid being in sufficient quantity to substantially reduce the buffer action normally present in said milk without said acid.

8. As a new article of diet, a concentrated unfermented milk product which is nutritively substantially equivalent to human milk and contains a relatively large amount of butter fat subdivided in relatively small particles and enveloped in self-preserving food material and also containing as a minor ingredient an innocuous acid which has been added before desiccation thereof, said acid being in sufficient quantity to substantially reduce the buffer action normally present in said milk without said acid.

CARL NIELSEN.